UNITED STATES PATENT OFFICE.

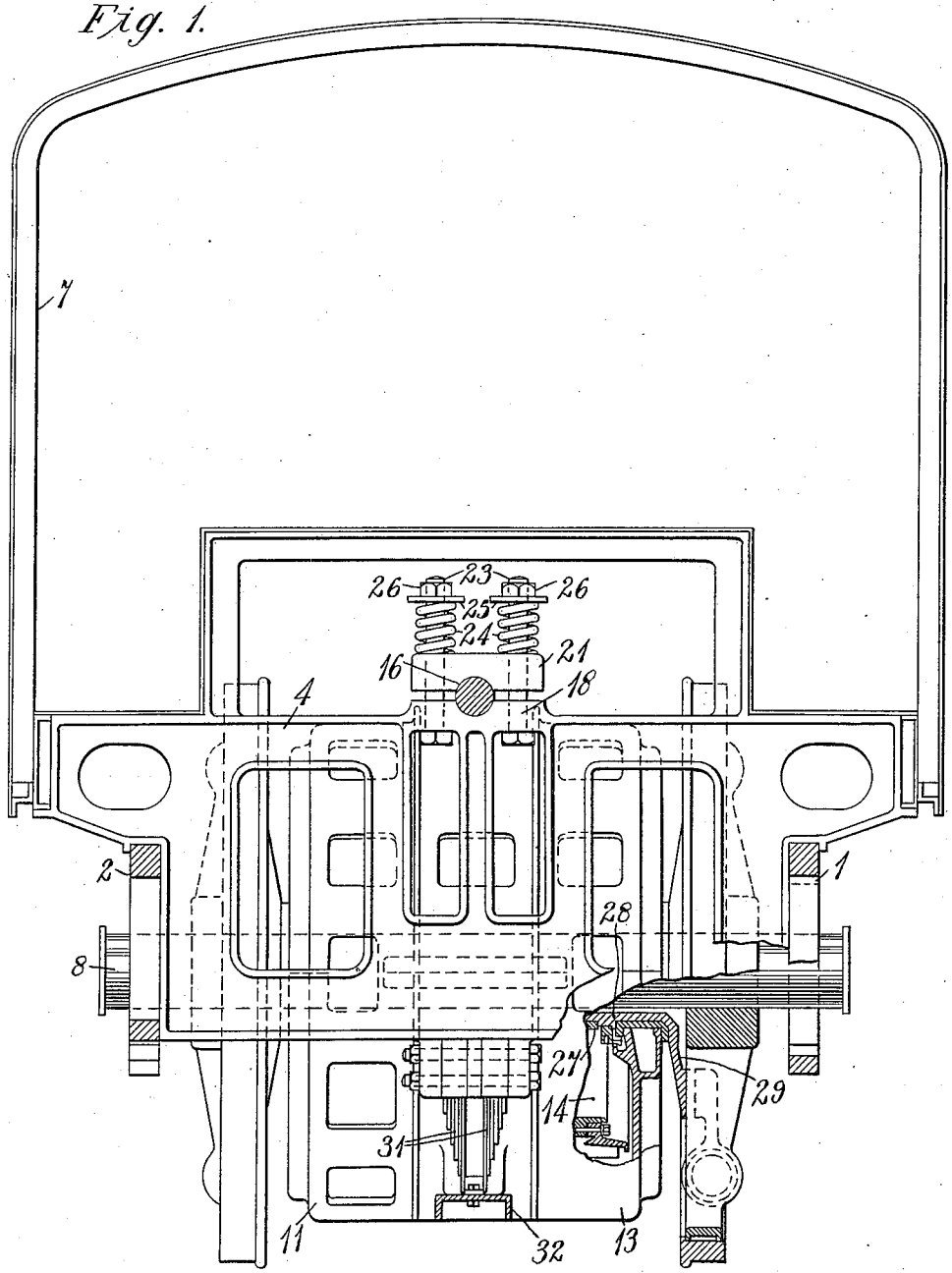

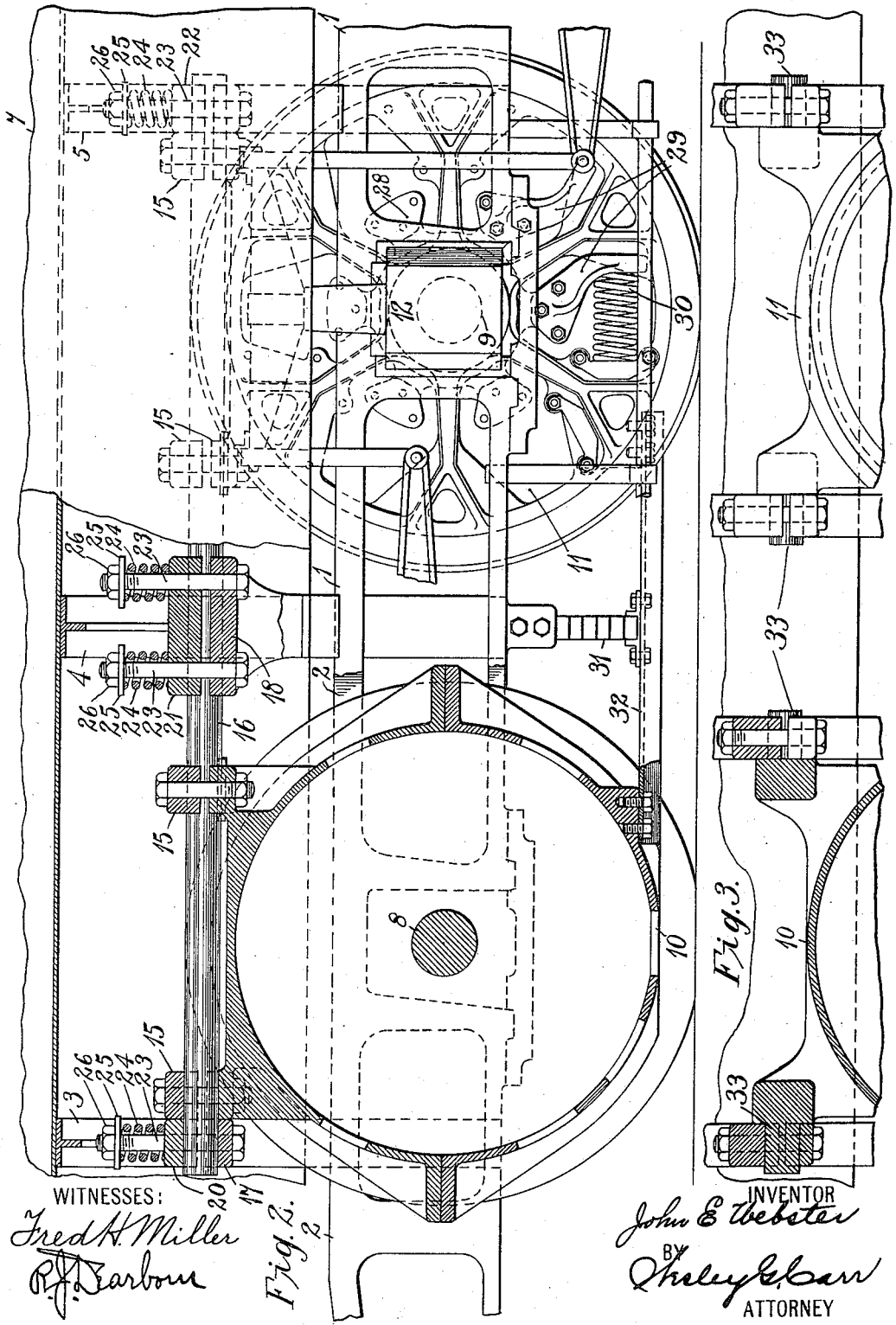

JOHN E. WEBSTER, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,017,122.     Specification of Letters Patent.     Patented Feb. 13, 1912.

Application filed June 20, 1910. Serial No. 567,907.

*To all whom it may concern:*

Be it known that I, JOHN E. WEBSTER, a citizen of the United States, and a resident of Pittsburgh, in the county of Allegheny and State of Pennsylvania, have invented a new and useful Improvement in Electric Locomotives, of which the following is a specification.

My invention relates to electric locomotives and other vehicles propelled by electric motors and it has special reference to such vehicles as are adapted to haul heavy loads at very high speeds.

The object of my invention is to provide simple and durable means for so suspending electric vehicle motors of large size as to secure driving connections between the motor armatures and the axles of the vehicles of a most direct and simple character, without encountering the difficulties which have frequently been met in vehicles having low centers of gravity.

One of the principal objections to the use of concentrically mounted electric driving motors of large size, arises from the fact that a body of large mass, *i. e.*, the motor, is located directly between the driving wheels of the locomotive and therefore tends to produce excessive strains and wear upon the flanges of the drivers and upon the rails, thereby making the track maintenance charges excessive. In order to avoid the above mentioned difficulty, it has been proposed to mount the electric driving motor or motors in the cab of the vehicle and establish a driving connection from the motor armature to the axles through gears or side rods.

It is my aim to avoid the necessity for introducing connecting rods or gears and, at the same time, to eliminate the disadvantages of the so-called concentric mounting in which the motor armature is substantially concentric with the axle of the locomotive to which it is coupled.

According to my present invention, I support the motor from the locomotive frame substantially on the gravity axis of the locomotive and mount the armature of the motor on a sleeve or quill which fits loosely over the axle of the locomotive and is operatively connected to the vehicle drivers by springs, or some other yielding connections, which not only permit of a certain amount of rotary adjustment between the armature and the axle, but also a considerable amount of longitudinal adjustment, in order that the driving wheel axle, considered as a whole, may follow the curves and irregularities in the track without necessitating any sudden movement of the motor, the mass of which is, of course, very great.

Figure 1 of the accompanying drawings is a sectional elevation of an electric locomotive embodying my invention, one of the driving motors being shown in elevation and parts of one wheel being broken away to disclose the driving connection. Fig. 2 is a side elevation of a portion of the locomotive shown in Fig. 1, showing the arrangement of two electric motors on adjacent driving axles, one of the motor frames being shown in section to illustrate more clearly the means of suspension. Fig. 3 is a view corresponding to a portion of Fig. 2 and illustrating a slightly modified means for suspending the electric motor.

Referring to Figs. 1 and 2 of the drawings, the locomotive here shown comprises side frames 1 and 2, cross ties 3, 4 and 5, a cab 7, driving wheel axles 8 and 9 and electric driving motors 10 and 11. The axles 8 and 9 are provided with bearing boxes 12 on which the side frames of the locomotive are supported, in the usual manner. Each of the motors 10 and 11 comprises an armature 14 and a relatively stationary frame 13 which is preferably divided, in a horizontal plane, into two sections in order to facilitate access to the armature. The upper half of the field frame is provided with lugs 15 which are bored to receive a rod or shaft 16, and are preferably split in a horizontal plane, the two parts being bolted together so that the motor may easily be removed without necessitating the removal of the shaft 16. The motors 10 and 11 are both secured to the shaft 16, which is supported by means of the cross ties 3, 4 and 5, as shown in Fig. 2, bearings 17, 18 and 19 being provided for the shaft. Bearing blocks 20, 21 and 22 may be bolted, or otherwise removably secured, to the cross ties, but I prefer to employ bolts 23 which extend completely through the bearing blocks and through portions of the cross ties, springs 24 which surround the ends of the bolts and washers 25 that are held in position by nuts 26 to maintain the springs in compression. By this means, the two halves of the cross tie bearings grip the shaft 16 with considerable force and thus retard its rotary adjustment. The motor frames are preferably keyed, or otherwise rigidly secured to the shaft 16 so that the shaft and the friction in the shaft bearings tend to retard oscillation of the motors.

The motor armatures are maintained concentric with the motor field frames by means of bearings 27 that are provided in the end frames of the motors, in a well known manner. Each armature is mounted on a quill 28, the inside diameter of which is considerably larger than the outside diameter of the axle which it surrounds.

The quill 28 is provided, at its ends, with radial arms 29 which extend outwardly between the spokes of the wheels to which they are connected by tangential springs 30, whereby a yielding connection which is the same in principle as that shown and described in Patent No. 937,436, granted October 19, 1909, to the Westinghouse Electric & Manufacturing Company on an application filed by me April 10, 1908, is established. Modifications of this structure may be employed if desired.

The shaft 16 is so placed that its center line is substantially co-incident with the longitudinal gravity axis of the locomotive in order that the motors may have as little tendency as possible to vibrate or forcibly change their positions when the locomotive is in operation. Furthermore, the friction which is intentionally introduced into the shaft bearings permits rotary adjustment, but tends to prevent oscillation of the motors about the shaft 16 as an axis.

By reason of the fact that the sleeves or quills 28 are considerably larger than the axles with which they are associated and that a yielding driving connection is established between each motor armature and the corresponding driving wheels, the wheel axles, as a whole, are permitted to follow the irregularities of the track and to otherwise adjust themselves independently of the motor, thereby materially reducing the shocks to which the rails are subjected, for example.

It is evident that the mass of the motor is very great, relative to that of the wheel axle, and, consequently, although the motor is located between the wheels, the method of suspension is such that the difficulties usually encountered with this arrangement are avoided. The springs 30, which constitute the yielding driving connection, will, of course, tend to center the motors, but it may be found desirable to provide additional centering means, such as springs 31, which are attached to the cross tie 4 and project tangentially therefrom, being secured at their lower ends to a longitudinal rod or beam 32 which is bolted to the motor frames, as shown in Fig. 2.

The lugs 15 may be replaced by trunnion projections 33, as shown in Fig. 3, of the drawings, and the springs 24 may be omitted, the lower half of the tie rod bearing being removable in order to permit the motors to be detached from the locomotive frame. The central cross tie 4 of Fig. 2 may, of course, be replaced by a pair of cross ties, and other structural modifications may be effected within the spirit and scope of my invention.

The arrangement of my invention differs materially from those in which the motor is suspended from the vehicle frame by means of links, in that the reactive forces produced by the motor torque are completely absorbed by the tight fitting trunnion bearings. There is, therefore, no tendency for the motor to vibrate from this cause and no special torque-opposing devices are necessary.

I claim as my invention:

1. In a railway vehicle, the combination with a driving wheel axle and a frame having a plurality of cross ties, of an electric driving motor surrounding the axle and yieldingly connected thereto and means for pivotally suspending the motor from the vehicle frame in its central longitudinal plane.

2. In a railway vehicle, the combination with a driving wheel axle and a frame having a plurality of cross ties, of an electric driving motor surrounding the axle and yieldingly connected thereto and pivotally suspended from the cross ties, the axis of adjustment lying in the central longitudinal plane of the vehicle.

3. In a railway vehicle, the combination with a driving wheel axle and a frame supported thereon and having a plurality of cross ties, of an electric driving motor surrounding the axle and yieldingly connected thereto and pivotally suspended from a pair of adjacent cross ties, the axis of adjustment being substantially coincident with the longitudinal gravity axis of the vehicle.

4. In a railway vehicle, the combination with a driving wheel axle and a frame supported thereon and having a plurality of cross ties, of an electric driving motor comprising a rotor surrounding the axle and yieldingly connected thereto, a stator having trunnion projections rotatably supported upon a pair of adjacent cross ties in an axis which lies in the central longitudinal plane of the vehicle.

5. In a railway vehicle, the combination with a driving wheel axle and a frame supported thereon and having a plurality of cross ties, of an electric driving motor comprising a rotor surrounding the axle and yieldingly connected thereto, a stator having trunnion projections rotatably supported by a pair of adjacent cross ties upon a horizontal axis substantially coincident with the longitudinal gravity axis of the locomotive.

6. In an electric locomotive, the combination with a plurality of driving wheel axles, a frame supported on the axles and provided with a plurality of cross ties having central bearings, of electric driving motors comprising armatures severally surrounding the axles and yieldingly connected thereto, and field frames having trunnion projections rotatably mounted in the cross tie bearings, said bearings being forcibly held in engagement with the trunnion projections to retard the rotary adjustment of the motor field frames.

7. In an electric locomotive, the combination with driving wheel axles, a frame supported thereon and provided with cross ties, and a longitudinal shaft rotatably supported by said cross ties, of electric driving motors comprising rotors severally surrounding the axles and yieldingly connected thereto, and stators rigidly secured to said shaft.

8. In an electric locomotive, the combination with driving wheel axles, a frame supported thereon and provided with a plurality of cross ties having central bearings and a longitudinal shaft rotatably mounted in said bearings, of electric driving motors comprising armatures severally surrounding the axles and yieldingly connected thereto, field frames mounted on said shaft and means for preventing relative rotation between the frames and the shaft.

9. In an electric locomotive, the combination with driving wheel axles, a frame supported thereon and provided with a plurality of cross ties having central bearings and a longitudinal shaft rotatably mounted in said bearings, of electric driving motors comprising armatures severally surrounding the axles and yieldingly connected thereto, field frames mounted on said shaft, said bearings being forcibly held in engagement with the shaft to retard the rotary adjustment of the motor field frames.

10. In an electric locomotive, the combination with driving wheel axles, a frame supported thereon and provided with a plurality of cross ties having central bearings and a longitudinal shaft rotatably mounted in said bearings, of electric driving motors comprising armatures severally surrounding the axles and yieldingly connected thereto and field frames mounted on said shaft, said bearings being forcibly held in engagement with the shaft and said field frames being keyed to the shaft to respectively retard the rotary adjustment of the motor field frames relative to the shaft and to prevent independent rotary adjustment thereof.

In testimony whereof, I have hereunto subscribed my name this 18th day of June, 1910.

JOHN E. WEBSTER.

Witnesses:
R. J. DEARBORN,
B. B. HINES.

Copies of this patent may be obtained for five cents each, by addressing the "Commissioner of Patents, Washington, D. C."